United States Patent [19]
Noureddini

[11] Patent Number: 6,015,440
[45] Date of Patent: Jan. 18, 2000

[54] PROCESS FOR PRODUCING BIODIESEL FUEL WITH REDUCED VISCOSITY AND A CLOUD POINT BELOW THIRTY-TWO (32) DEGREES FAHRENHEIT

[75] Inventor: Hossein Noureddini, Lincoln, Nebr.

[73] Assignee: Board of Regents of the University of Nebraska, Lincoln, Nebr.

[21] Appl. No.: 08/961,939

[22] Filed: Oct. 31, 1997

[51] Int. Cl.[7] ............................................ C10L 1/18
[52] U.S. Cl. ................................. 44/388; 44/447; 44/448
[58] Field of Search .............................. 44/308, 443, 447, 44/448, 449, 386, 388, 389

[56] References Cited

U.S. PATENT DOCUMENTS

| | | | |
|---|---|---|---|
| 5,145,563 | 9/1992 | Culbreth, III et al. | 203/64 |
| 5,160,506 | 11/1992 | Schur et al. | 44/308 |
| 5,308,365 | 5/1994 | Kesling, Jr. et al. | 44/447 |
| 5,413,634 | 5/1995 | Shawl et al. | 106/696 |
| 5,476,971 | 12/1995 | Gupta | 568/619 |
| 5,520,708 | 5/1996 | Johnson et al. | 44/388 |
| 5,578,090 | 11/1996 | Bradin | 44/308 |

OTHER PUBLICATIONS

Methyl and Ethyl Soybean Esters as Renewable – – – Clark et al., JAOCS, vol. 61, No. 10, Oct. 1984.

Diesel Fuel Derived from Vegetable Oils, III – – – Mittelbach et al., JAOCS, vol. 65, no. 7, Jul. 1988.

Low Temperature Properties of Triglyceride–Based – – – Dunn et al., JAOCS, vol. 72, No. 8, 1995.

Reducing the Crystallization Temperature of Biodiesel – – – Lee et al., JAOCS, vol. 73, No. 5, 1996.

Vegetable Oils: From Table to Gas Tank Chowdhury et al., Chem. Eng., Feb. 1993.

A Low–Waste Process for the Production of Biodiesel – – – Ahn et al., Separation Sci & Tech, 307(7–9), 1995.

Technical Uses of Fatty Acid Esters, Meffert et al., JAOCS, vol. 61, No. 2, 1984.

Biodiesel, An Updated Report, Pearl, Render, Jun. 1996.

*Primary Examiner*—Margaret Medley
*Attorney, Agent, or Firm*—James D. Welch

[57] ABSTRACT

Triglycerides are reacted in a liquid phase reaction with methanol and a homogeneous basic catalyst. The reaction yields a spatially separated two phase result with an upper located non-polar phase consisting principally of non-polar methyl esters and a lower located phase consisting principally of glycerol and residual methyl esters. The glycerol phase is passed through a strong cationic ion exchanger to remove anions, resulting in a neutral product which is flashed to remove methanol and which is reacted with isobutylene in the presence of a strong acid catalyst to produce glycerol ethers. The glycerol ethers are then added back to the upper located methyl ethyl ester phase to provide an improved biodiesel fuel.

12 Claims, 2 Drawing Sheets

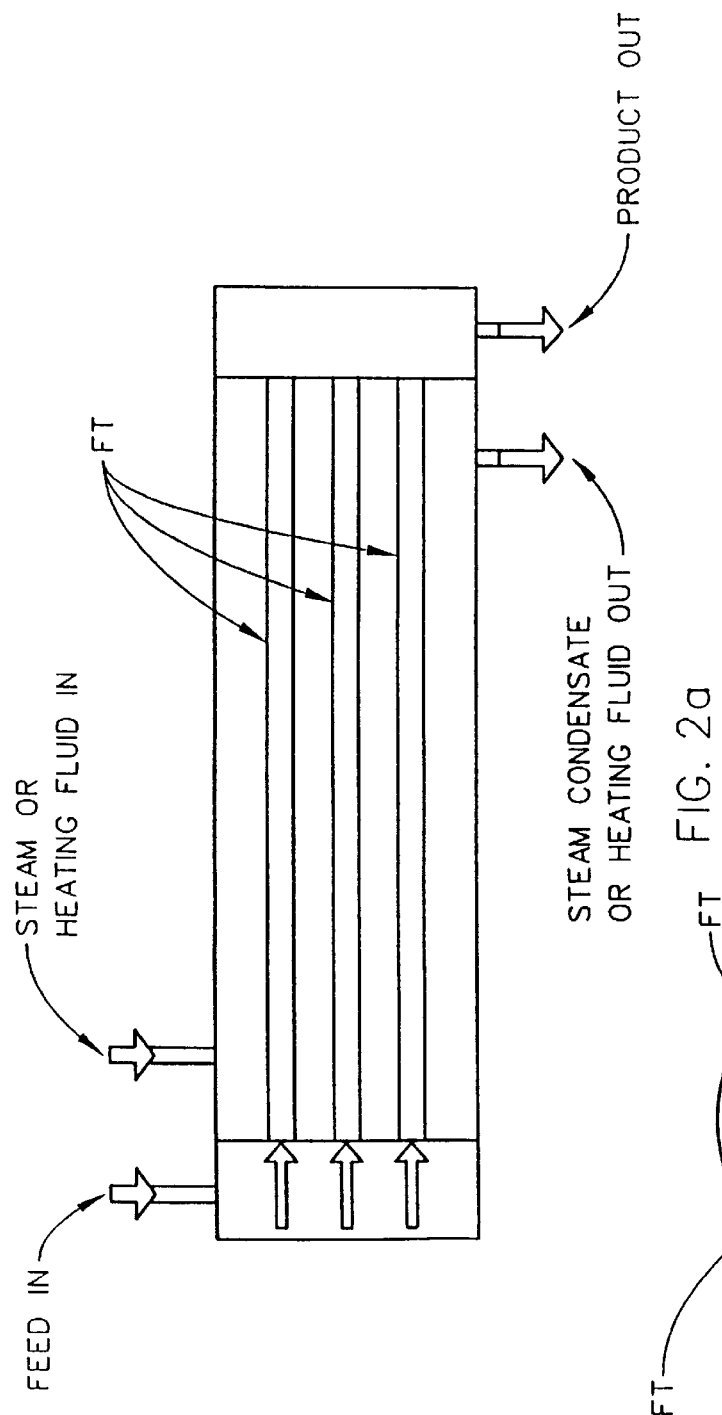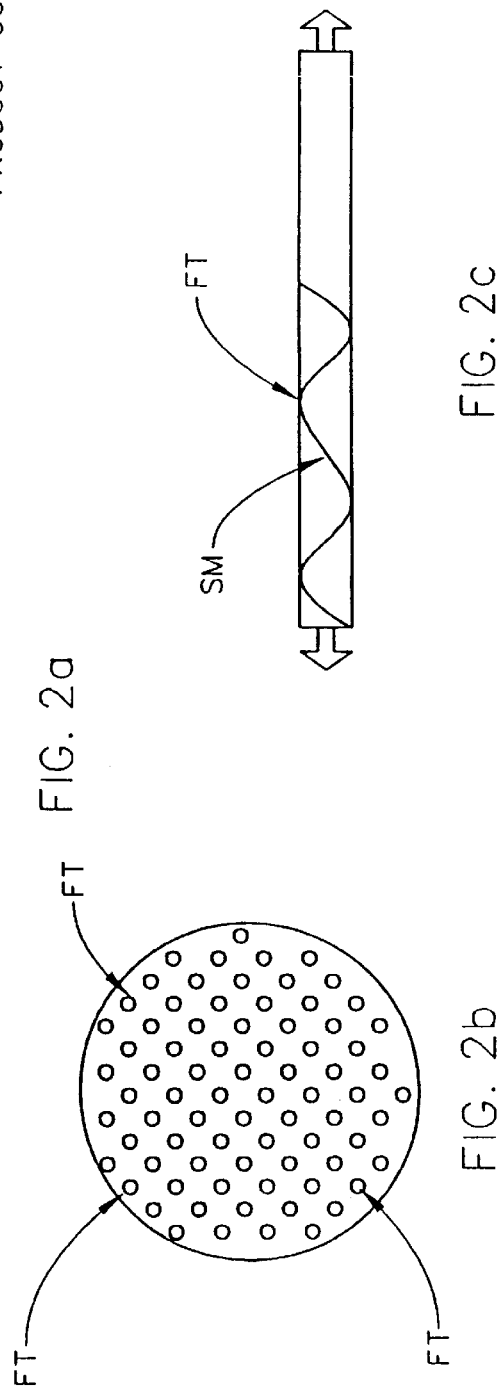

PROCESS FOR PRODUCING BIODIESEL FUEL WITH REDUCED VISCOSITY AND A CLOUD POINT BELOW THIRTY-TWO (32) DEGREES FAHRENHEIT

TECHNICAL FIELD

The present invention is related to production of oxygenated fuels, and more particularly to a process for producing a "fuel volume maximizing" mixture of biodiesel fuel with ethers of crude glycerol, which crude glycerol is a produced as a by-product of a biodiesel fuel producing esterification process applied to renewable source triglycerides.

BACKGROUND

Since the introduction of biodiesel fuel in South Africa prior to World War II, work has proceeded to increase its viability as a fuel substitute. In more recent years, environmental and economic pressures, (eg. events such as Oil Embargoes, and laws such as the Clean Air Act of 1990), have provided impetus for continued development. Most effort to date has been focused on waste minimization, by-product separation technology, and/or by-product utilization. This is best demonstrated by noting that production of Biodiesel fuel by a methyl-esterification process as applied to soy oil, produces an effluent stream with twenty (20%) percent crude glycerol content. Other desirable goals include production of biodiesel with cleaner burning properties and improved cold-temperature flow characteristics.

It is noted that Biodiesel fuel has been reported by Clark et al., in an article titled "Methyl and Ethyl Soybean Esters As Renewable Fuels For Diesel Engines", JAOCS, Vol. 61, No. 10 October 1984, to produce $NO_x$ emissions higher than produced by Diesel fuel. Additional related discussion is found in an article titled "Diesel Fuel Derived From Vegetable Oils, III. Emission tests Using Methyl Esters Of Used Frying Oil", by Mittelbach et al., JAOCS, Vol. 65, No. Jul. 7, 1988.

It is also noted that the use of biodiesel fuel, (ie. methyl esters of triglycerides), is limited in practice as it demonstrates a "Cloud Point" of near zero (0.0) degrees centigrade, (ie. thirty-two (32) degrees Fahrenheit), while the Cloud point of Diesel #2 is near negative sixteen (−16) degrees centigrade. A similar disparity exists with respect to the "Pour Point", which for Biodiesel fuels is near negative two (−2) degrees centigrade, while that for Diesel fuel is near negative twenty-seven (−27) degrees centigrade. This is discussed in an article titled "Low-Temperature Properties Of Triglyceride-Based Diesel Fuels: Transesterified Methyl Esters and Petroleum Middle Distillate/Ester Blends", by Dunn et al, JAOCS, Vol. 72, No. 8, 1995. These adverse cold temperature flow properties of Biodiesel fuel as compared to Diesel fuel, with accompanying reduced viscosity and low temperature flow lead to problems such as truck fuel filter plugging below thirty-two (32) degrees fahrenheit. The use of Biodiesel fuels can not become widespread unless this problem is overcome. Suggested solutions include Methyl Ester "winterization", which is discussed in an article titled "Reducing The Crystallization Temperature Of Biodiesel By Winterizing Methyl Soyate", by Lee et al., JAOCS, Vol. 73, No. 5, 1996; and application of biotechnology to produce biodiesel with improved specifications, as discussed in an article titled "Vegetable Oils: From Table To Gas Tank", by Chowdhury et al., Chem. Eng. February 1993. Such avenues of investigation might prove successful but as yet are of questionable industrial value.

As mentioned, esterification of soy oil to form Biodiesel produces approximately twenty (20%) crude glycerol as a by-product, and while uses for crude glycerol have been pursued, mostly in Europe, costly purification steps must typically he performed to produce even a low grade product of questionable value. Uses for said low grade product include mixing with animal manure to form a fertilizer, and mixing with feed for animals. This is discussed in an article titled "A Low Waste Process For The Production Of Biodiesel", Ahn et al., Sep. Sci. & Tech., 30(7–9) 1995. Research has shown that potential exists for use of bacteriologically transformed crude glycerol to form products useful in plastics production, ("Vegetable Oils: From Table To Gas Tank", by Chowdhury et al., Chem. Eng. February 1993). The most promising and economically viable use for crude glycerol might be, however, conversion into mono and di-fatty acid esters of crude glycerol. This is discussed in an article titled "Technical Uses Of Fatty Acid Esters", by Meffert, JAOCS, Vol. 61, No. 2, February 1984. This alternative might prove to be most beneficial in the economics of Biodiesel fuel production. To understand why this is the case, it must be understood that crude glycerol produced as a by-product in production of Biodiesel fuel via transesterification of triglycerides is inherently insoluble in the Biodiesel Fuel.

Patents of which the inventor is aware are:
U.S. Pat. No. 5,308,365 to Kesling Jr. et al.;
U.S. Pat. No. 5,578,090 to Bradin;
U.S. Pat. No. 5,520,708 to Johnson et al.;
U.S. Pat. No. 5,476,971 to Gupta;
U.S. Pat. No. 5,413,634 to Shawl et al.;
U.S. Pat. No. 5,160,506 to Schur et al.;
U.S. Pat. No. 3,168,385 to Giammaria et al.; and
U.S. Pat. No. 5,145,563 to Culbreth III et al. The 708 Patent to Johnson et al. describes reaction of triglycerides with methanol in the presence of base to produce fatty acid methyl esters, and then describes a specific treatment to reduce "Cloud-Point". However, no mention of the use of ethers of glycerol as an agent to reduce "Cloud-Point" is found therein. The 971 Patent to Gupta describes reacting pure glycerol with isobutylene in the presence of an acid catalyst in a two phase reaction to produce mono-, di- and tri-tertiary butyl ethers of glycerol. The 090 Patent to Bradin describes to reduce fatty acid methyl ester content, and the 365 Patent to Kessling describes the use of Glycerol ethers mixed with Biodiesel fuels to improve emissions content, although no indication of improved Cloud-point or viscosity properties were noted. Said 365 Patent describes reduction of particulate, hydrocarbon, carbon monoxide and unregulated aldehyde content in tests on diesel fuel in which ethers of glycerol were present. The use of ethers of glycerol as extractive distillation agent is described in the 563 Patent to Culbreth III et al., and the 634 Patent to Shaw et al. describes use of ethers of glycerol as an additive to enhance physical properties of cement. The 506 Patent to Schur et al. describes a fuel for use in two stroke engines and comprises oils or ester oils. The 385 Patent to Giammaria et al. describes an anti-knock "appreciator" which combines ethers and alkyl esters.

Alkyl ethers of glycerol have been explored for decades, with references existing back to the 1930's. In addition, it is noted that use of ether derivatives in gasoline reformulation to form oxygenated gasoline, (eg. MTBE & ETBE), is well known. In fact, it is estimated that two-hundred-sixty-thousand (260,000) barrels of methyl (MTBE) Butyl Esters are utilized each day to this end. This is discussed in an article titled "Biodiesel: An Updated Report", by Pearl, Render, June 1996. The rise of (MTBE) production, has produced materials and methods which allow their glycerol based counterpart, (glycerol tertiary butyl ether (GTBE)), to be made easily using an acidic ion exchange resin such as Amberlyst-15. Use of said resin enables high conversion of glycerol and isobutylene into mono-, di-, and tri- tertiary butyl ethers of glycerol. The reaction is more easily taken to high conversions, (no simultaneous distillation as with (MTBE) production), because of the multifunctionality of glycerol and hence stepwise products.

It is noted that known large scale processes for production of Biodiesel fuel largely downplay the significance of the economic loss caused by by-product crude glycerol production, and consider the resulting crude glycerol volume, (which again constitutes approximately twenty (20%) percent of the source triglyceride volume), as something which can be simply discarded, or sold for whatever the market will pay. As costly purification of said crude glycerol is typically necessary to prepare it for third party usage, the price the market will pay is typically minimal. It should then be understood that a process for producing Biodiesel fuel which not only conveniently reclaims said by-product glycerol, but advantageously reclaims it into produced Biodiesel fuel in a way that improves the Biodiesel fuel, would have utility. It is further noted that present invention produced Biodiesel, including glycerol ethers, can be utilized in production of Diesel fuel to produce reformulated Diesel fuel which includes, typically, twenty (20%) percent or more Biodiesel fuel.

No known prior art reference, alone or in combination with other references however, describes, or fairly suggests a process including the use of the product of etherification of crude glycerol produced as a by-product of Biodiesel fuel production, (which Biodiesel fuel is produced by the esterification of renewable triglycerides), as an additive back to said Biodiesel fuel to reduce the Cloud-point, viscosity and pour-point thereof, and to provide cost per volume reducing, maximum Biodiesel fuel volume production, from a given volume of source triglycerides. In addition it is noted that previous methods known to the inventor, for producing methyl esters and glycerol ethers, have been mutually exclusive.

It should be apparent that even in view of known prior art, there remains a need for a procedure which enables the use of crude glycerol, (produced as a by-product of a Biodiesel fuel producing esterification of renewable triglycerides procedure), as a pour-point, viscosity and Cloud-point temperature reducing Biodiesel fuel volume maximizing, cost per volume reducing, additive to said produced Biodiesel fuel. Such a procedure would provide economic and operational benefits, and provide a Biodiesel fuel with properties more closely resembling those of Diesel fuel.

DISCLOSURE OF THE INVENTION

It is known that subjecting source triglycerides (soy oil derived, for instance), to known methyl-esterification processes results in an effluent stream consisting of approximately eighty (80%) Biodiesel fuel and twenty (20%) crude glycerol. As mentioned in the Background Section of this Disclosure, said crude glycerol is inherently Insoluble in said produced Biodiesel fuel. However, if subjected to an etherification process, said crude glycerol forms a product which is soluble with said Biodiesel fuel, thereby enabling conversion of essentially an entire volume of source triglycerides to a volume of usable Biodiesel fuel.

Continuing, the insolubility of crude glycerol in Biodiesel fuel, (which crude glycerol and Biodiesel fuel are both produced by a transesterification process applied to triglycerides), enables relatively easy separation of a majority of said Biodiesel fuel from said crude glycerol, although some percentage of said Biodiesel fuel will accompany glycerol.

The present invention recognizes the above facts and in view thereof teaches a procedure by which Cloud-point, viscosity and pour-point improving ethers of glycerol, (which are soluble in Biodiesel fuel), can be produced from by-products of Biodiesel fuel producing esterification of source triglycerides. The present invention also recognizes the beneficial effects on emission content of oxygenating Biodiesel fuel, and provides for preferred production of doubly oxygenated ethers of glycerol, however, it is emphasized that the major benefit of providing ethers of glycerol to Biodiesel fuel is the dramatic effect such is observed to have on the temperature dependence of Cloud-point, viscosity and pour-point of the resulting reformulated Biodiesel fuel.

Continuing then, the present invention starts with triglycerides from vegetable oil and/or animal fat source(s) Then by a transesterification process produces a mixture of Biodiesel fuel and crude glycerol, said Biodiesel fuel being an ester of fatty acids) with a Chemical Formula:

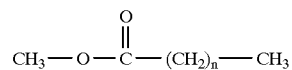

and said Glycerol having the Chemical Formula:

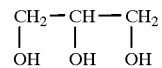

It is noted that the Biodiesel produced has an undesirably high Cloud Point of more than thirty-two (32) Fahrenheit Degrees.

The present invention then teaches that separating the crude glycerol from the Biodiesel fuel by a process which provides approximately eighty (80%) percent of the Biodiesel fuel in a relatively pure form. The remaining twenty (20%) percent of the Biodiesel fuel produced remains in mixture with the glycerol. It is further noted that approximately eighty-five (85%) percent of the original triglycerides have become separated "Pure" Biodiesel fuel via the process described to this point, and that approximately fifteen (15%) percent of original triglycerides have become a mixture of Biodiesel (20%) and crude glycerol (80%).

Next, the present invention teaches that the mixture of crude glycerol and Biodiesel fuel esters be subjected to an etherification process which serves to produce a mixture of ethers of glycerol and Biodiesel esters.

This step can be optionally followed by separating out unwanted ethers of glycerol which have two hydroxyl (OH) groups present, leaving only high oxygen content ethers of glycerol which have only one, or no, such hydroxyl (OH) group, such as Di and Tri-Ethers:

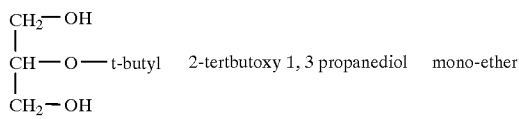

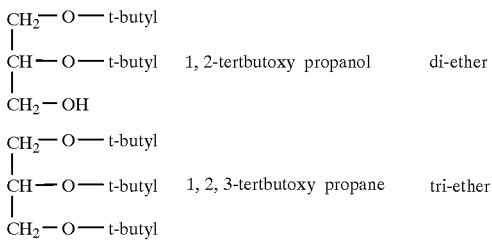

(The present invention has investigated the effect of adding the indicated ethers of glycerol to Biodiesel fuel and found that di- and tri- ethers provide better results.)

Next, what is thought to be Patentable, is that the mixture of the ethers of glycerol and Biodiesel fuel esters is recombined with the "Pure" Biodiesel fuel to form an "Oxygenated" Biodiesel fuel with a Cloud-point reduced to approximately twenty (20) degrees Fahrenheit. Note that this reclaims all Biodiesel fuel ester which was not separated out initially but rather went along with the crude glycerol, and because of the etherification of the crude glycerol, beneficially provides oxygenated ethers of glycerol to the Biodiesel esters. The end result is a Biodiesel fuel with reduced Cloud-point, and lower viscosity as well.

The present invention also provides that some of the crude glycerol or glycerol ethers produced can be utilized for other purposes should all of it not be required to improve the Cloud-point, pour-point and viscosity properties of the Biodiesel fuel produced.

A method of the present invention can then be described as a process of producing an oxygenated biodiesel fuel with a cloud point below 32 degrees fahrenheit, beginning with the step of providing a quantity of triglycerides followed by performing transesterification of at least some of said triglycerides to produce a mixture of biodiesel fuel and crude glycerol. This is followed by separating out, in an essentially pure state, most of said ester biodiesel fuel from said mixture of biodiesel fuel and crude glycerol leaving a mixture of crude glycerol with some amount of said ester biodiesel fuel; and performing etherification of the glycerol in said mixture of crude glycerol with some amount of said ester biodiesel fuel. Finally the resulting mixture of glycerol ethers with some amount of ester biodiesel fuel therein is remixed with the essentially pure state, ester biodiesel fuel; such that an oxygenated biodiesel fuel comprising a mixture of esters of triglycerides and ethers of glycerol is produced with a cloud point below 32 degrees fahrenheit. Said method can further comprise the steps of separating out unwanted glycerol and double hydroxyl group containing ethers of glycerol, leaving ethers of glycerol with no more than one hydroxyl group present, prior to remixing the resulting mixture of glycerol ethers with some amount of ester biodiesel fuel present with the essentially pure state, ester biodiesel. As well, said method can involve diverting some of the separated out crude glycerol produced by the transesterification of said triglycerides, prior to performing the etherification of remaining crude glycerol in said mixture of crude glycerol.

The present invention also includes a product produced by the process comprising the steps of:

a. providing a quantity of triglycerides;

b. performing transesterification of at least some of said triglycerides to produce a mixture of biodiesel fuel and crude glycerol;

c. separating out, in an essentially pure state, most of said ester biodiesel fuel from said mixture of biodiesel fuel and crude glycerol leaving a mixture of crude glycerol with some amount of said ester biodiesel fuel;

d. performing etherification of the glycerol in said mixture of crude glycerol with some amount of said ester biodiesel fuel; and e. remixing the resulting mixture of glycerol ethers with some amount of ester biodiesel fuel produced in step d. With the step c. separated out, essentially pure state, ester biodiesel fuel;

such that an oxygenated biodiesel fuel comprising a mixture of esters of triglycerides and ethers of glycerol is produced with a cloud point below 32 degrees fahrenheit;

said process optionally further comprising at least one additional step selected from the group consisting of:

f. after step d, and before step e., separating out unwanted double hydroxyl group containing ethers of glycerol produced in step d., leaving ethers of glycerol with no more than one hydroxyl group present, prior to remixing the resulting mixture of glycerol ethers with some amount of ester biodiesel fuel present with the step c. separated out, essentially pure state, ester biodiesel; and g. diverting some of the crude glycerol produced in the step b. transesterification of said triglycerides and which is separated out in step c. prior to performing the etherification of remaining crude glycerol in said mixture of crude glycerol in step d.

The present invention further comprises an oxygenated biodiesel fuel with a cloud point below 32 degrees fahrenheit comprising esterified triglycerides in mixture with ethers of crude glycerol, said crude glycerol being the by-product of a process which provides said esters of triglycerides beginning with triglycerides from at least one source selected from the group consisting of: (plant and animal), said oxygenated biodiesel fuel being at least eighty (80%) esterified triglycerides by volume.

The present invention will be better understood by reference to the Detailed Description Section of the present invention in coordination with the Drawings.

SUMMARY OF THE INVENTION

It is therefore a purpose of the present invention to teach a coordinated single process that couples methyl-ester production with co-production of glycerol ethers, utilizing renewable triglycerides as a source.

It is another purpose of the present invention to teach a coordinated single process that produces methyl-ester Biodiesel fuel including co-produced glycerol ethers utilizing renewable triglycerides as a source, said Biodiesel fuel having a Cloud-point below thirty-two (32) degrees Fahrenheit.

It is yet another purpose of the present invention to teach a Biodiesel fuel having a Cloud-point below thirty-two (32) degrees Fahrenheit, produced from a coordinated single process that produces methyl-ester Biodiesel fuel including co-produced glycerol ethers utilizing renewable triglycerides as a source.

It is still yet another purpose of the present invention to teach a Biodiesel fuel with a Cloud-point below thirty-two (32) degrees Fahrenheit which is suitable for mixing with Diesel fuel.

It is yet still another purpose of the present invention to teach a coordinated single process that provides a volume of methyl-ester with co-produced glycerol ethers, from an essentially equal volume of source triglycerides.

BRIEF DESCRIPTION OF THE DRAWINGS

FIGS. 2a–2c demonstrate a preferred heat exchanger/reactor unit in which transesterification is cause to occur.

DETAILED DESCRIPTION

Figure 1:
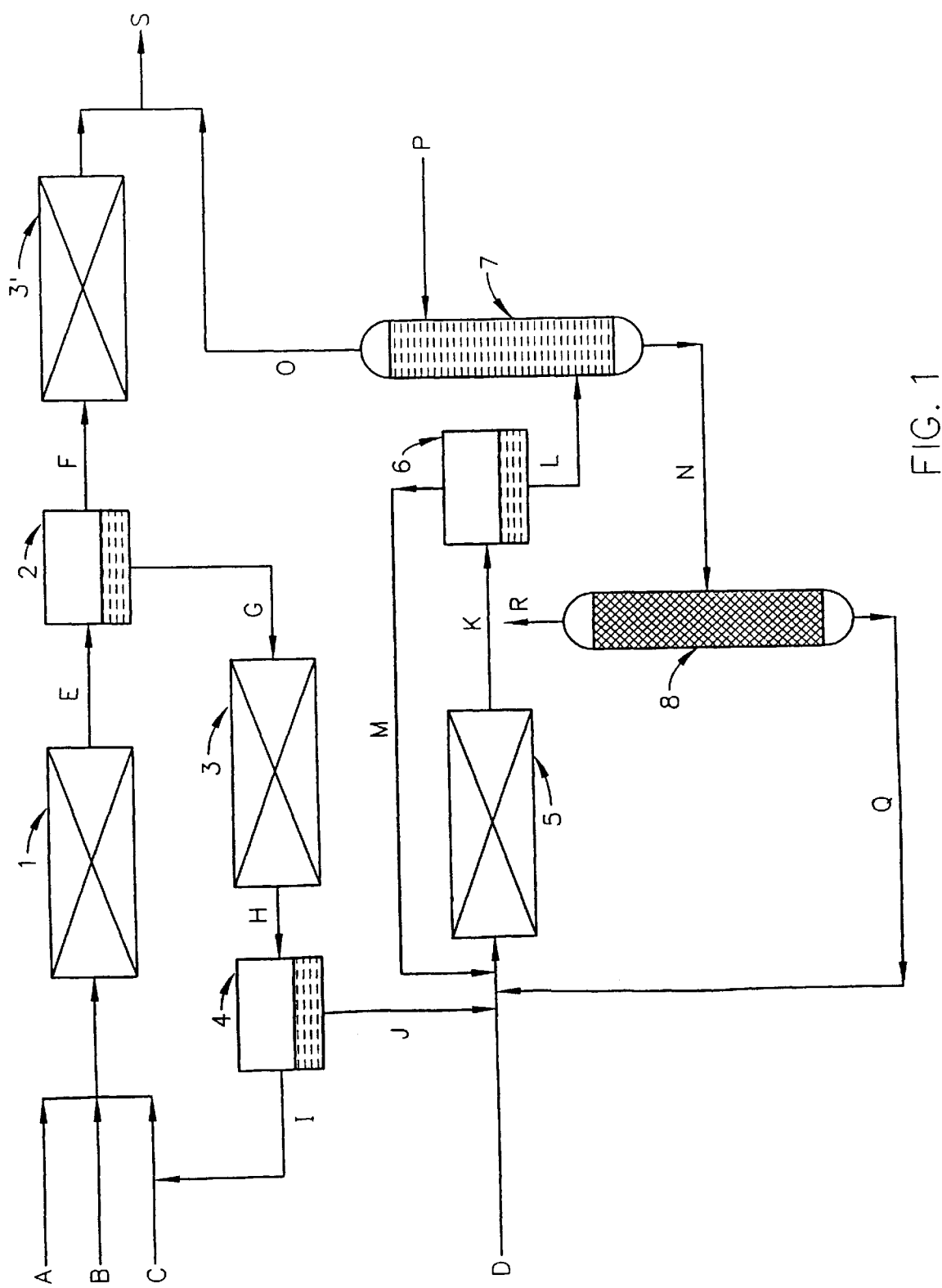
FIG. 1 shows a system, in flow diagram form, for practicing the procedure of the present invention.

Referring now to FIG. 1, there is shown an embodiment of a system for practicing the process of the present invention wherein triglycerides, methanol, suitable base and isobutylene raw materials are continuously reacted to produce Biodiesel fuel. (Note, FIG. 1 utilizes letter designators (A,B,C . . . etc.) to identify process flow streams and number designators, (1, 2, 3 . . . etc.) to identify system elements). Triglyceride (A), Base (NaOH, KOH etc.) (B) and Methanol (C) streams are fed to the Transesterification reaction unit (1). Note that a recycled methanol stream (I), the source of which will become clear supra herein, is simultaneously fed to Methanol Stream (C). The feed (I) comprises 0.1 to 1.0 wt % base and a mole ratio of methanol to triglyceride of between 3 to 10. The Transesterification unit (1) can consist of one or more heated continuously stirred tank reactor(s) (CSTR), or one or more tubular reactor(s) with static mixers. Temperatures between 70 and 80 degrees centigrade and pressures from 1 to 2 atmospheres are utilized as necessary to maintain the liquid product in the liquid phase, said product being a mixture flow stream containing glycerol, methyl esters and methanol (E). The flow stream (E) is fed into separator unit (2), formation of an upper non-polar phase comprising approximately 80 vol %, and a lower phase comprising approximately 20 vol %, occurs.

Flow stream (F), consisting primarily of methyl esters is shown to flow from the upper portion of Separator unit (2), where it combines with stream (O) (discussed supra herein), to become output Product stream (S). (Note that said flow stream (F) can be caused to pass through a deionization unit (3')). A flow stream (G), (consisting of glycerol and approximately 10–15 wt % residual methyl esters, methanol and base), is shown to flow from the lower portion of Separator unit (2). Separation unit (2) can consist of a continuous decanter or a centrifuge/clarifier. The water, it is noted, is capable of providing residual methyl esters content significantly below 10 wt %.

All or part of the glycerol stream (G) proceeds to deionization unit (3) where anions (Na+, K+ etc.) are removed and neutralized, with the results being formed into flow stream (H). (Note Deionization units (3) & (3') can each consist of either a continuous ion exchange system, such as for practicing Higgins, Ashai, Fluicon etc. processes, or can consist of two or more resin beds, one or more of which are "on-line" while others are "off-line" for regeneration. Ion exchange material can be any of a number of available strongly acidic hydrogen form macromolecule cationic exchange resins, (eg. Amberlyst-15, Dowex-50 etc.)).

Continuing, flow stream (H) is shown as fed to Flash Unit (4) where methanol is removed by vaporization and is recycled as said flow stream (I). Flow stream (J), which originates in the lower portion of Flash Unit (4), consists of glycerol and residual methyl esters in a neutralized state. It is noted that flow stream (J) might contain some residual methanol, the concentration of which depends on initial mole ratio of feeds into Flash Unit (4).

Flow stream (J) is shown as combined with flow streams (M), (Q), and (D), which flow streams (M), (Q), and (D) are described directly. Flow stream (D) consists of raw feed isobutylene, flow stream (M) consists of recycled isobutylene, and flow stream (Q) consists of recycled glycerol and monoethers of glycerol. In reaction unit (5) glycerol and isobutylene are reacted in a liquid phase reaction in the presence of an acid catalyst. The isobutlyene:glycerol mole ratio being minimally approximately 1.0 and ranging to above 3.0 to favor production of higher ethers, (ie. di and tri-ethers). Reaction unit (5) can consist of one or more continuously stirred tank reactor(s) (CSTR's) in series, a reactive distillation reactor, fixed bed or plug flow reactors. In addition, Reaction unit (5) can be operated with continuous catalyst regeneration or in conjunction with sibling reactors in regeneration cycles. Multiple reactors can also be operated in series with appropriate phase separation and/or flash recycles.

The flow stream exiting Reaction unit (5) consists of a mixture of glycerol ethers, (mono-tertiary butyl ether, di-tertiary butyl ether, tri-tertiary butyl ether), glycerol and residual methyl ester and isobutylene. In addition there may be co-products which result from reactions, such as methyl tertiary butyl ether, (from reaction between methanol and isobutylene), 2,2,4 trimethyl 1-pentene and 2,2,4 trimethyl 2-pentene (from dimerization of isobutylene). Occurrence of co-products can be eliminated by careful selection of reaction conditions and catalyst, however.

Flow stream (K) is shown as fed to Flash unit (6) where excess isobutylene is removed for recycling via flow stream (M). Flow stream (L) then consists of a mixture of mono-, di- and tri-ethers of glycerol and residual methyl ester and glycerol.

Flow stream (L) is shown to be fed to Extraction unit (7), into which water is entered as flow stream (P). Flow stream (N) is shown to exit Extraction unit (7) and consists of water, mono-ether, and glycerol. Flow stream (O) also is shown to exit Extraction unit (7) and consists of di- and tri-ethers. Flow stream (O) is shown as being combined with flow stream (F) to form the final Product stream (S) which comprises present Invention glycerol-ether containing, low Cloud-point, low viscosity methyl ester Biodiesel fuel.

Flow stream (N) is shown as fed to Distillation unit (8) where water is removed via flow stream (R). Flow stream (Q) is shown exit Distillation unit (8) and serves to recycle mono-ethers and residual glycerol.

EXAMPLE

As a practical example of the described process, it is to be understood that approximately 137.5 lbs/hr of soy oil, 40 lbs/hr methanol and 0.1775 lbs/hr of sodium hydroxide can be entered to continuously stirred tank Reaction unit (1) which is operated at 20 psig and approximately 80 degrees centigrade. Said conditions providing essentially 100% conversion of entered triglycerides to fatty acids and methyl esters. Phase separation in Separator unit (2) provides methyl esters in an upper location, and a mixture of glycerol and approximately 10–15 wt % residual methyl esters, methanol and base at a lower location. Approximately 14 lbs/hr of glycerol phase is then neutralized, present methanol flashed off, and the results sent to a continuously stirred Reaction unit (5) which is operated at 80 degrees centigrade and 320 psig. Said Reaction unit (5) also has present therein approximately 4 wt % Amberlyst-15 catalyst with a residence time of 2 hrs. Approximately 17.5 lbs/hr isobutylene is also fed to Reaction unit (5). Said conditions provide for the following approximate flow stream (K) composition, in (wt %):

| TRI-ETHER | DIETHER | MONO-ETHER | GLYCEROL | ISO-BUTYLENE | METHYL-ESTERS |
|---|---|---|---|---|---|
| 9% | 47% | 21% | 5% | 14% | 4% |

The flow stream (K) is then caused to pass through Flash unit (6) and Extraction unit (7) such that diethers, triethers, methyl esters and trace monoethers are formed into flow stream (O) and added "back" to the bulk methyl esters present in flow stream (F) to provide the present invention Biodiesel fuel. The final product Biodiesel fuel is produced at approximately 145 lbs/hr and consists of approximately, (in wt %):

| ETHERS | METHYL ESTERS |
|---|---|
| 12% | 88% |

Said produced Biodeisel has a kinematic viscosity of 5.94 cst at 70 degrees Fahrenheit and a Cloud-point of 23 degrees Fahrenheit, which is a greater than 0.5 cSt reduction in viscosity and 9 degree Cloud-point depression compared to Biodiesel without glycerol ethers present.

Briefly, the present invention process then comprises providing Triglycerides which are reacted in a liquid phase reaction with methanol and a homogeneous basic catalyst, said reaction yielding a spatially separated two phase result with an upper located non-polar phase consisting principally of non-polar methyl esters and a lower located phase consisting principally of glycerol and residual methyl esters. At least the glycerol phase, is passed through a strong cationic ion exchanger to remove anions, resulting in a neutral product which is flashed to remove methanol and which is reacted with isobutylene in the presence of a strong acid catalyst to produce glycerol ethers. The glycerol ethers are then added back to the upper located methyl ethyl ester phase to provide an improved present invention biodiesel fuel.

Turning now to FIGS. 2a–2c there is shown details of a specific Heat Exchange/Reactor unit. As mentioned infra herein, the Transesterification unit (1) can consist of one or more, (up to hundreds or even thousands), heated tube(s), each optionally containing a static mixer (SM) configured as shown in FIGS. 2a–2c. FIG. 2a shows a side cross-sectional view indicating the presence of Feed Tubes (FT), and Feed-In means for entering Triglyceride (A), Base (NaOH, KOH etc.) (B) and Methanol (C) streams thereto. Also indicated are Steam/Heating-Fluid entering means, and Steam/Heating Fluid-Out and Product-Out means. FIG. 2b shows an elevational end-on view, and FIG. 2c shows a detail of a single Feed Tube (FT) within which is present a Static Mixer (SM). In use triglycerides are caused feed-In Feed Tubes (FT) at said Feed-In means, and steam or heating fluid is caused to flow over the Feed-Tubes, to the end that the temperature of the triglycerides in the Feed Tubes (FT) is controlled as said triglycerides travels through said Feed-Tubes and exits at the Product-Out means. Said steam or heating fluid exits via the Steam/Heating Fluid-Out means.

Having hereby disclosed the subject matter of the present invention, it should be apparent that many modifications, substitutions, and variations of the present invention are possible in light thereof. It is to be understood that the present invention can be practiced other than as specifically described and should be limited in scope and breadth only by the appended Claims.

I claim:

1. A process of producing an oxygenated biodiesel fuel with a cloud-point below 32 degrees Fahrenheit, said oxygenated biodiesel fuel consisting of a mixture of transesterified triglycerides and a cloud-point reducing amount of etherified glycerol, said process comprising the steps of:
   a. providing a quantity of triglycerides;
   b. transesterifying at least a portion of said triglycerides by mixing with a base and methyl alcohol to produce a mixture of transesterified triglycerides and crude glycerol;
   c. separating out, in an essentially pure state, most of said transesterified triglycerides from said mixture of transesterified triglycerides and crude glycerol, thereby also providing separated-out substantially crude glycerol;
   a. etherifying the crude glycerol provided in step c., by mixing isobutylene therewith in sufficient quantity to maintain an isobutlyene:glycerol mole ratio which favors production of higher glycerol di and tri-ethers as opposed to mono-ethers; and
   e. remixing at least a portion of the resulting glycerol ethers produced in step d., with at least a portion of the step c. separated-out, essentially pure state transesterified triglycerides;

said steps a.–e. serving to produce said oxygenated biodiesel fuel with a cloud-point below 32 degrees Fahrenheit, without other cloud-point reducing additive(s) and/or glycerol ethers from a source other than that identified in step d., being added thereinto.

2. A process of producing an oxygenated biodiesel fuel with a cloud-point below 32 degrees Fahrenheit as in claim 1, which further comprises at least one additional step selected from the group consisting of:
   f. after step d. and before step e., by treating said etherified glycerol with water, separating out unwanted double hydroxyl group containing ethers of glycerol produced in step d., prior to remixing at least a portion of the resulting glycerol ethers and at least a portion of said essentially pure state transesterified triglycerides separated-out in step c.; and
   g. diverting a portion of the crude glycerol produced in the step b. transesterification of said triglycerides and which is substantially separated-out in step c., prior to performing the etherification of said crude glycerol in step d.

3. A process of producing an oxygenated biodiesel fuel with a cloud-point below 32 degrees Fahrenheit as in claim 1, in which the step of performing transesterification of at least a portion of said triglycerides to produce a mixture of transesterified triglycerides and crude glycerol involves providing and using a static-mixer-heat exchanger/reactor unit comprised of feed tube(s) which have an internal volume and outer surface and through which feed tube(s) said quantity of triglycerides and base and methyl alcohol is caused to flow in use, which heat exchange/reactor further includes means for causing steam or heating fluid to flow around the outer surface of said feed tube(s) in use so as to control the temperature of said triglycerides and base and methyl alcohol during passage through said feed tube(s).

4. An oxygenated biodiesel fuel, with a cloud-point below 32 degrees Fahrenheit, consisting of a mixture of transesterified triglycerides and a cloud-point reducing amount of etherified glycerol, said oxygenated biodiesel fuel being produced by a process comprising the steps of:
   a. providing a quantity of triglycerides;
   b. esterifying at least a portion of said triglycerides by mixing with a base and methyl alcohol to produce a mixture of esterified triglycerides and crude glycerol;

c. separating-out, in an essentially pure state, most of said esterified triglycerides from said mixture of esterified triglycerides and crude glycerol, thereby also providing separated-out substantially crude glycerol;

d. etherifying the crude glycerol provided in step c., by mixing isobutylene therewith; and e. remixing at least a portion of the resulting glycerol ethers produced in step d., with at least a portion of the step c. separated out, essentially pure state esterified triglycerides to provide said biodiesel fuel with a cloud-point below 32 degrees Fahrenheit;

said steps a.–e. serving to produce said oxygenated biodiesel fuel with a cloud-point below 32 degrees Fahrenheit without other cloud-point reducing additive(s) and/or etherified glycerol from a source other than that identified in step d., being added thereinto;

said process optionally further comprising at least one additional step selected from the group consisting of:

f. after step d, and before step e., by treating said etherified glycerol with water, separating out unwanted double hydroxyl group containing ethers of glycerol produced in step d., prior to remixing the resulting mixture of glycerol ethers with at least a portion of the essentially pure state esterified triglycerides separated out in step c.; and g. diverting a portion of the crude glycerol produced in the step b. esterification of said triglycerides and which is provided in step c., prior to performing the etherification of the crude glycerol provided in step d.

5. An oxygenated biodiesel fuel, with a cloud-point below 32 degrees Fahrenheit, consisting of a mixture of transesterified triglycerides and a cloud-point reducing amount of etherified glycerol, said ethers of glycerol being produced from crude glycerol which is a by-product of a process which provides said esters of triglycerides, said esters of triglycerides being produced by transesterification of triglycerides provided from at least one source selected from the group consisting of:

plant and animal, said oxygenated biodiesel fuel being produced by a procedure which comprises at least one step selected from the group consisting of:

a. the step of passing said crude glycerol through a strong cationic ion exchanger to remove anions, resulting in substantially de-ionized crude glycerol; and b. the step of passing said transesterified triglycerides through a strong cationic ion exchanger to remove anions, resulting in substantially de-ionized transesterified triglycerides.

6. An oxygenated biodiesel fuel, with a cloud-point below 32 degrees Fahrenheit, consisting of a mixture of transesterified triglycerides and a cloud-point reducing amount of etherified glycerol, said oxygenated biodiesel fuel being produced by a procedure comprising the steps of:

a. reacting triglycerides in a liquid phase with methanol and a homogeneous basic catalyst, such that said reaction yields a spatially separated two phase result with an upper located non-polar phase consisting principally of non-polar methyl esters and a lower located phase consisting principally of glycerol and residual methyl esters;

b. passing the glycerol through a strong cationic ion exchanger to remove anions, resulting in a substantially de-ionized glycerol;

c. flashing said substantially de-ionized glycerol produced in step b. to remove methanol;

d. reacting said flashed substantially de-ionized glycerol produced in step c. with isobutylene in the presence of a strong acid catalyst to produce glycerol ethers; and e. adding at least a portion of said glycerol ethers produced in step d. to at least a portion of the non-polar methyl esters produced in step a. to provide said biodiesel fuel with a cloud-point below 32 degrees Fahrenheit;

said steps a.–e. serving to produce said oxygenated biodiesel fuel with a cloud-point below 32 degrees Fahrenheit without other cloud-point reducing additive(s) and/or etherified glycerol from a source other than that identified in step d. being added thereinto.

7. An oxygenated biodiesel fuel, with a cloud-point below 32 degrees Fahrenheit as in claim 6, said oxygenated biodiesel fuel being produced by a procedure which further comprises the step of passing said non-polar methyl esters produced in step a. through a strong cationic ion exchanger to remove anions, resulting in substantially de-ionized methyl esters prior to the step e. adding of at least a portion of said glycerol ethers produced in step d. to at least a portion of the non-polar methyl esters produced in step a., to provide said biodiesel fuel with a cloud-point below 32 degrees Fahrenheit;

said steps a.–e. and said additional step of passing said non-polar methyl esters produced in step a. through a strong cationic ion exchanger, serving to produce said oxygenated biodiesel fuel with a cloud-point below 32 desrees Fahrenheit without other cloud-point reducing additive(s) and/or etherified glycerol from a source other than that identified in d. being added thereinto.

8. A process of producing an oxygenated biodiesel fuel, with a cloud-point below 32 degrees Fahrenheit as in claim 1, which further comprises at least one additional step selected from the group consisting of:

a. passing the crude glycerol through a strong cationic ion exchanger to remove anions, resulting in substantially de-ionized crude glycerol; and b. passing said transesterified triglycerides through a strong cationic ion exchanger to remove anions, resulting in substantially de-ionized transesterified triglycerides.

9. A process of producing an oxygenated biodiesel fuel, with a cloud-point below 32 degrees Fahrenheit as in claim 5, which comprises the step of passing the transesterified triglycerides through a strong cationic ion exchanger to remove anions, resulting in substantially de-ionized transesterified triglycerides.

10. A method of producing a biodiesel fuel with a cloud-point below 32 degrees Fahrenheit, said biodiesel fuel consisting of a mixture of esterified triglycerides and a cloud-point reducing amount of etherified glycerol, said method comprising the steps of:

a. providing triglycerides;

b. esterifying said triglycerides to provide a mixture of esterified triglycerides and crude glycerol;

c. substantially separating said esterified triglycerides from said crude glycerol;

d. etherifying said crude glycerol by treating with isobutylene; and e. mixing together at least a portion of said esterified triglycerides and at least a portion of said etherified crude glycerol to provide said biodiesel fuel with a cloud-point below 32 degrees Fahrenheit;

said steps a.–e, serving to produce said biodiesel fuel with a cloud-point below 32 degrees Fahrenheit without the required addition of other cloud-point reducing additives and/or the required addition of etherified glycerol from a source other than that identified in step d.

11. A method of preparing a biodiesel fuel with a cloud-point below thirty-two (32) degrees, said biodiesel fuel consisting of a mixture of esterified triglycerides and a cloud-point reducing amount of etherified glycerol as in claim 10, which method further comprises at least one additional step selected from the group consisting of, a. passing the crude glycerol through a strong cationic ion exchanger to remove anions, resulting in substantially de-ionized crude glycerol; and b. passing said esterified triglycerides through a strong cationic ion exchanger to remove anions, resulting in substantially de-ionized esterified triglycerides.

12. A method of preparing a biodiesel fuel with a cloud-point below thirty-two (32) degrees, said biodiesel fuel consisting of a mixture of esterified triglycerides and a cloud-point reducing amount of etherified glycerol as in claim 10, in which said method of producing said biodiesel fuel is a continuous process.

* * * * *